United States Patent
Dwivedi et al.

(10) Patent No.: US 9,125,124 B2
(45) Date of Patent: Sep. 1, 2015

(54) APPARATUS AND METHOD OF HANDOFF SELECTION

(75) Inventors: Ashwani Dwivedi, Hyderabad (IN); Sriman Miryala, Hyderabad (IN); Shashidhar Shenoy, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 464 days.

(21) Appl. No.: 13/556,092

(22) Filed: Jul. 23, 2012

(65) Prior Publication Data
US 2014/0022919 A1 Jan. 23, 2014

(51) Int. Cl.
| | |
|---|---|
| H04L 12/28 | (2006.01) |
| H04W 36/30 | (2009.01) |
| H04W 36/00 | (2009.01) |
| H04J 1/16 | (2006.01) |
| H04W 88/04 | (2009.01) |
| H04W 76/04 | (2009.01) |

(52) U.S. Cl.
CPC .......... *H04W 36/30* (2013.01); *H04W 36/0083* (2013.01); *H04W 76/043* (2013.01); *H04W 88/04* (2013.01)

(58) Field of Classification Search
CPC ...... H04L 47/10; H04L 43/50; H04L 12/2697
USPC ......................... 370/252, 331, 338
See application file for complete search history.

(56) References Cited

U.S. PATENT DOCUMENTS

| | | | |
|---|---|---|---|
| 7,894,823 B2 | 2/2011 | Alemany et al. | |
| 8,126,454 B2 | 2/2012 | Montemurro et al. | |
| 8,559,957 B2 * | 10/2013 | Hunzinger | 455/437 |
| 2005/0018633 A1 * | 1/2005 | Shirota et al. | 370/331 |
| 2007/0183374 A1 * | 8/2007 | Classon et al. | 370/338 |
| 2009/0245133 A1 | 10/2009 | Gupta et al. | |

FOREIGN PATENT DOCUMENTS

| | | |
|---|---|---|
| EP | 1246487 A2 | 10/2002 |
| EP | 2124498 A2 | 11/2009 |

OTHER PUBLICATIONS

Athanasiou, et al., "Cooperative Handoff in Wireless Networks", IEEE 19th International Symposium on Personal, Indoor and Mobile Radio Communications, 2008, 6 pp.
Athanasiou, et al., "An 802.11k Compliant Framework for Cooperative Handoff in Wireless Networks", EURASIP Journal on Wireless Communications and Networking, 2009, 14 pp.
International Search Report and Written Opinion—PCT/US2013/051521, International Search Authority—European Patent Office, Dec. 17, 2013.
Partial International Search Report—PCT/US2013/051521—ISA/EPO—Oct. 25, 2013.

* cited by examiner

*Primary Examiner* — John Pezzlo
(74) *Attorney, Agent, or Firm* — S. Hossain Beladi

(57) ABSTRACT

In a particular embodiment, a method of determining a handoff selection includes determining, at a first station, a direct link quality factor value associated with a direct link between the first station and a second station. The method also includes receiving one or more measurements from the second station. The one or more measurements correspond to one or more access points that are wirelessly detectable by the second station. The method also includes determining a particular access point of the one or more access points as a handoff target based on the one or more measurements.

37 Claims, 4 Drawing Sheets

APPARATUS AND METHOD OF HANDOFF SELECTION

I. FIELD OF THE DISCLOSURE

The present disclosure is generally directed to handoff selection.

II. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

In a wireless network, an access point (AP) may be associated with one or more stations (STAs). The AP can request the stations (STA) associated with the AP to identify and determine measurements (e.g., signal strengths) of neighboring APs. Additionally, a first STA associated with the AP may scan for (e.g., take measurements of) other APs if the first STA desires to be associated with a different AP (e.g., initiate a handoff). However, in certain circumstances, measurements performed by the first STA may not be accurate enough to make precise handoff decisions or may require additional resources that consume power and resources of the first STA.

To obtain more accurate measurements, the first STA may request information of neighboring APs from the AP the first STA is currently associated with or request a second STA associated with the AP, via the AP, to scan for and provide the information of the neighboring APs. Once the first STA has obtained the information (e.g., measurements) of the neighboring APs, the first STA may make a handoff selection. However, the first STA is generally unaware of location/signal level of other STAs performing measurements on behalf of the AP (or for the first STA). Thus, the first STA does not know whether the received information (e.g., the measurements) of neighboring APs (received from the associated AP or the second STA) is relevant (i.e., appropriate) and/or accurate for the first STA to use when making a handoff decision.

III. SUMMARY

A first STA may initiate a direct link setup with one or more second STAs. The first STA may determine a direct link quality factor ($\alpha$) value corresponding to each second STA that provides an indication of a location/signal strength of the second STA relative to the first STA. The first STA may determine the direct link quality factor ($\alpha$) value during a direct link discovery procedure with a particular second STA or once a direct link is established with the particular second STA. For example, the direct link quality factor ($\alpha$) value may be determined based on a ratio of a measured link quality ($R_{direct}$) (e.g., a measured signal value associated with the direct link setup) and an expected link quality ($R_{ideal}$) (e.g., a theoretical signal value associated with the direct link setup).

During operation, the first STA may request one or more of the second STAs to scan for neighboring APs. For example, the first STA may request each second STA to scan for neighboring APs based on the determined link quality factor ($\alpha$). The first STA may receive, from each of the one or more second STAs that performed the scan, one or more measurements (e.g., received channel power indicator (RCPI) values) associated with neighboring APs. The first STA may store the one or more measurements and/or create a prioritized list of neighboring APs based on the measurements provided by the one or more second STAs via a direct link(s) between the first STA and the second STA(s). When the first STA makes a handoff decision while performing a voice over Wi-Fi (VO-WiFi) communication (e.g., a VOWiFi call), the first STA may determine whether to use the one or more measurements provided by a particular second STA based on a direct link quality factor ($\alpha$) associated with the particular second STA. When the first station determines to use the one or more measurements provided by the particular second STA, the first STA may determine and select a particular AP of the identified neighboring APs as a handoff target based on the one or more measurements.

In a particular embodiment, a method includes determining, at a first station, a direct link quality factor value associated with a direct link between the first station and a second station and receiving one or more measurements from the second station. The one or more measurements correspond to one or more access points that are wirelessly detectable by the second station. The method also includes determining whether to use the one or more measurements received from the second station based on the direct link quality factor value. The method further includes, upon determining to use the one or more measurements received from the second station, determining a particular access point of the one or more access points as a handoff target based on the one or more measurements.

In another particular embodiment, an apparatus includes a processor and a memory coupled to the processor. The processor is configured to determine a direct link quality factor value associated with a direct link to a station and determine whether to use one or more measurements received from the station based on the direct link quality factor value. The one or more measurements correspond to one or more access points that are wirelessly detectable by the station. The processor is further configured to, upon determining to use the one or more measurements received from the station, determine a particular access point of the one or more access points as a handoff target based on the one or more measurements. The memory is configured to store the one or more measurements.

In another embodiment, a non-transitory processor-readable medium including instructions that, when executed by a processor, cause the processor to determine, at a first station, a direct link quality factor value associated with a direct link between the first station and a second station and determine whether to use one or more measurements received from the second station based on the direct link quality factor value. The one or more measurements correspond to one or more access points that are wirelessly detectable by the second station. The non-transitory processor-readable medium further includes instructions, executable by the processor, to cause the processor to, upon determining to use the one or more measurements received from the second station, determine a particular access point of the one or more access points as a handoff target based on the one or more measurements.

In another particular embodiment, a method includes determining, at a first station, a direct link quality factor value associated with a second station. The method also includes determining whether to request the second station to perform a scan for one or more access points within a wireless transmission range of the second station based on the direct link quality factor value associated with the second station.

One particular advantage provided by disclosed embodiments is that the first STA may be able to determine a relative location of the second STA with respect to the first STA. Additionally, the first STA may be enabled to determine whether received values (e.g., signal strength measurements) associated with neighboring APs are relevant or accurate enough to use when making a handoff decision. Thus, the first STA may make a handoff selection (e.g., select a particular AP) based on relative locations of each of one or more second STAs that provide measurements to the first STA.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
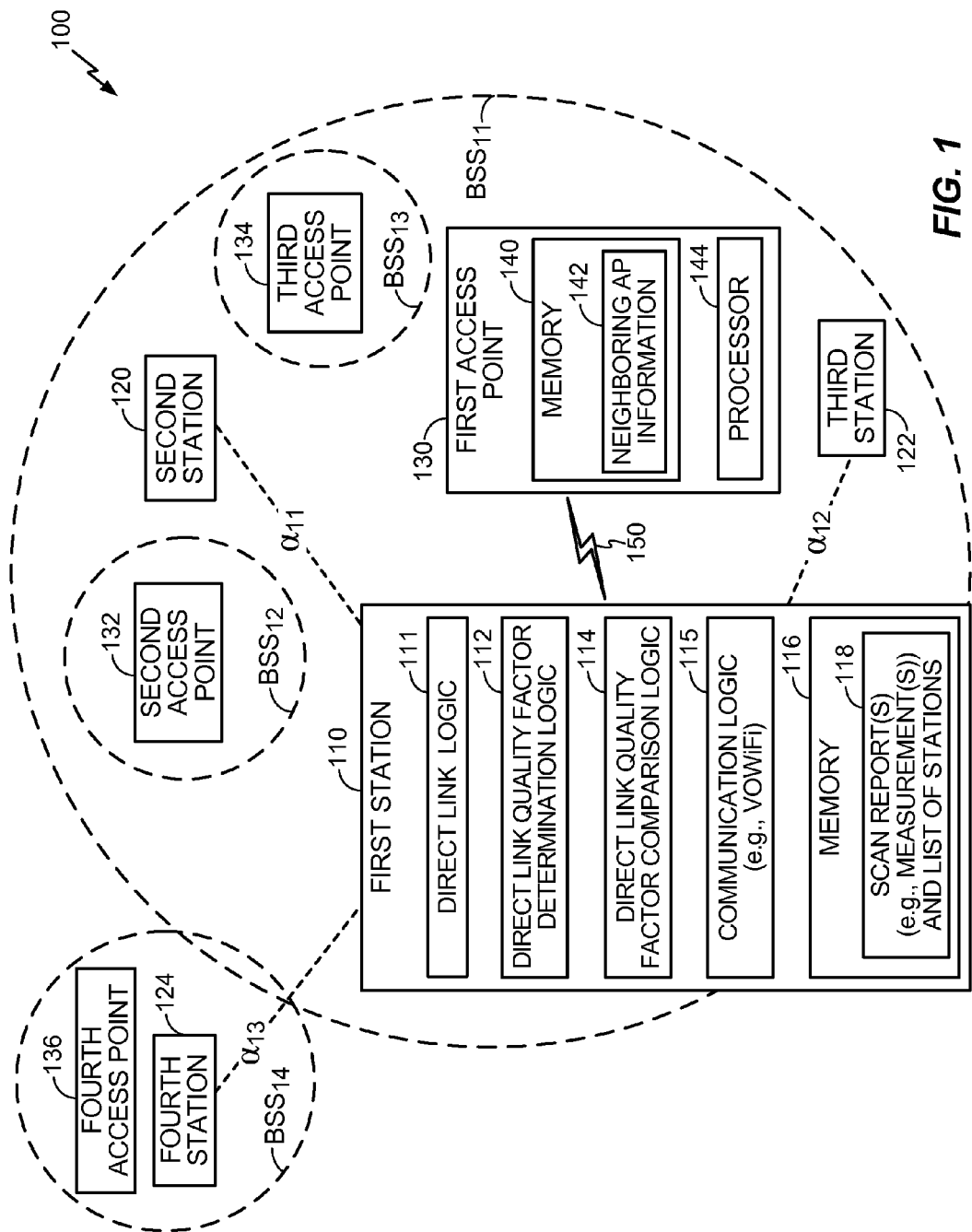
FIG. 1 is a block diagram of a first particular illustrative embodiment of a system to perform handoff selection based in part on at least one direct link quality factor ($\alpha$)

FIG. 1 is a diagram to illustrate a particular embodiment of a system 100 to perform handoff selection based in part on at least one direct link quality factor ($\alpha$). The system 100 may include one or more access points (APs) 130-136 (e.g., a base station, a gateway, a router, or another device operable to facilitate wireless communication) and one or more stations (STAs) 110, 120-124 (e.g., a mobile station, a wireless device, or a client device). The one or more STAs may communicate with other STAs directly (e.g., peer-to-peer, such as through use of a direct link connection) or via the one or more APs.

The one or more APs may include a first AP 130, a second AP 132, a third AP 134, and a fourth AP 136. In different embodiments, more or fewer APs may be present. Each of the APs 130-136 may be similar in form and function and, thus, any description of an individual AP is applicable to each of the APs 130-136. Each of the APs 130-136 may be associated with no STAs or a set of one or more STAs (e.g., STAs 110, 120-124), such as a mobile station and/or a fixed (stationary) station. For example, a particular STA may be associated with a particular AP via a wireless link (e.g., an Institute of Electrical and Electronics Engineers (IEEE) 802.11 protocol compliant connection) to obtain connectivity to the Internet or to a network (e.g., a wide area network). A set of STAs (or a null set of STAs) associated with a particular AP may be referred to as a basic service set (BSS). Accordingly, each of the APs 130-136 may include a corresponding BSS. For example, the first AP 130 may correspond to $BSS_{11}$, the second AP 132 may correspond to $BSS_{12}$, the third AP 134 may correspond to $BSS_{13}$, and the fourth AP 136 may correspond to $BSS_{14}$, as shown. In a particular embodiment, $BSS_{11}$ includes a first station 110, a second station 120, and a third station 122, each of $BSS_{12}$ and $BSS_{13}$ includes a null set (e.g., no STAs), and $BSS_{14}$ includes a fourth STA 124.

One or more of the APs 130-136 may be connected with one or more other APs to form an extended service set (ESS). For example, the first AP 130 and the fourth AP 136 may communicate with each other and, thus, form an ESS. Accordingly, the ESS of the first AP 130 and the fourth AP 136 may include all of the STAs associated with the first AP 130 and the fourth AP 136 (e.g., STAs 110, 120-124). In a particular embodiment, a system controller (not shown) may be coupled to and provide coordination and or control for one or more APs 130-136. For example, the first AP 130 and the fourth AP 136 may communicate through the system controller. In another embodiment, the first AP 130 and the fourth AP 136 communicate directly.

In an illustrative embodiment, the first AP 130 may include a processor 144 and a memory 140. The processor 144 may be coupled to the memory 140 and configured to control one or more operations of the first AP 130. The memory 140 may include (e.g., store) information 142 associated with one or more neighboring APs. The neighboring AP information 142 may include signal strength values associated with the neighboring APs 132-136 of the first AP 130. The first AP 130 may be configured to distribute the neighboring AP information 142 to one or more STAs, such as stations within a given BSS, such as, for example, STAs 110, 120, 122 in the $BSS_{11}$.

In the system 100, the one or more STAs may include the first STA 110, the second STA 120, the third STA 122, and the fourth STA 134. In different embodiments, more or fewer STAs may be present. Each of the STAs 110, 120-124 may be similar in form and function and, thus, a description of an individual STA is applicable to each of the STAs 110, 120-124. The one or more STAs 110, 120-124 may include a wireless communication device, a mobile (e.g., cellular) phone, a laptop computer (e.g., with a IEEE 802.11 wireless card), a personal computer, a tablet computer, a personal digital assistant (PDA), a game console, a set-top box (e.g. a wireless set-top box), or a combination thereof.

Each of the STAs 110, 120-124 may be associated with an AP 130-136 via a wireless link (e.g., an IEEE 802.11 protocol compliant connection) to obtain connectivity to the Internet or other network. A particular STA may communicate with one or more other STAs 110, 120-124 via a particular AP that the particular STA is associated with. The particular STA may be used (e.g., function) as an AP and communicate directly with another STA 110, 12-124, such as via a direct link. Accordingly, STAs and APs may have one or more common (e.g., similar) component.

In a particular BSS, a particular AP may request one or more STAs associated with the particular AP to perform measurements (e.g., using beacon request/report measurement action frames) to identify neighboring APs. For example, the particular AP may request an associated STA to determine signal strength values, such as received channel power indicator (RCPI) values, of neighboring APs detectable by the associated STA. The associated STA may determine the signal strength values and communicate the signal strength values to the particular AP.

For example, the first AP 130 may request the second STA 120 to identify neighboring APs. The second STA 120 may determine received channel power indicator (RCPI) values for one or more neighboring APs detectable by the second STA 120, such as the second AP 132, the third AP 134, and the fourth AP 136. The second STA 120 may transmit first RCPI values for the one or more neighboring APs to the first AP 130. The first AP 130 may receive the first RCPI values and store the first RCPI values in the memory 140 as neighboring AP information 142. Additionally, the first AP 130 may request the second STA 120 to perform an additional scan (e.g., after a time period as elapsed) and receive second RCPI values from the second STA 120. The first STA 110 may store the second RCPI values as the neighboring information 142 and replace the first RCPI values previously stored. In an alternative embodiment, the first STA 110 may only update values of the neighboring information 142 that have changed between the first RCPI values and the second RCPI values. The first AP 130 may provide the neighboring AP information 142 to other STAs, such as the first STA 110, periodically. The first STA 110 may use the received neighboring AP information 142 to make a handoff decision based on the RCPI values included in the neighboring AP information 142. However, because the first STA 110 may be unaware of a location or a signal level of the second STA 120 that determined the RCPI values included in the neighboring AP information 142, there is a high probability that the one or more measurements determined by the second STA 120 are inappropriate for use by the first STA 110.

Each of the STAs 110, 120-124 may acquire neighboring AP information for use in making handoff decisions. For example, when the first STA 110 decides to associate with a different AP, the first STA 110 may scan for other APs and determine (i.e., measure) a signal strength associated with each of the other APs. The first STA 110 may then select a particular AP as a handoff target based on the measured signal strengths. However, in certain scenarios (e.g., when the first STA 110 is engaged in a voice over Wi-Fi (VOWiFi) communication, measurements performed by the first STA 110 may not be possible or may not be sufficient (e.g., accurate) enough to make precise or informed handoff decisions. Accordingly, the first STA 110 may request signal strength information of neighboring APs from the AP that the first STA 110 is currently associated with (i.e., the first AP 130). Additionally, the first STA 110 may request one or more other STAs, such as the second STA 120, via the first AP 130, to scan for neighboring APs. In a particular embodiment, the first STA 110 may request the scan by one or more other STAs in the same $BSS_{11}$ as the first STA 110.

For example, the first STA 110 can request other STAs 120-122 to scan for neighboring APs 130-136 and to respond back to the first STA 110 with one or more measurements (e.g., signal strength information). For example, the first STA 110 may request the STAs 120, 122 in the $BSS_{11}$ to scan neighbor APs of the first AP 130. Each of the STAs 120, 122 may determine one or more measurements associated with the neighboring APs and provide the one or more measurements in a report to the first STA 110 via the first AP 130. In a particular embodiment, the STAs 120, 122 provide the report using beacon requests or report measurement action frames. The first STA 110 may use the received reports to make a handoff decision based on the one or more measurements (e.g., relative signal strengths) of different neighboring APs. However, because the first STA 110 communicates with the STAs 120, 122 via the AP 130, the first STA 110 may be unaware of a location or a signal level of either of the STAs 120, 122. Accordingly, there is a high probability that the one or more measurements determined by the STAs 120, 122 are inappropriate for use by the first STA 110. In a particular embodiment, the first STA 110 can also request the fourth STA 124 of and $BSS_{14}$ to scan for the neighboring APs 130-136 when the first AP 130 and the fourth AP 136 are included in an extended service set (ESS).

In an exemplary embodiment, the first STA 110 may include direct link logic 111, direct link quality factor determination logic 112, direct link quality factor comparison logic 114, communication logic 115, and a memory 116. The direct link logic 111 may enable the first STA 110 to communicate directly with another STA 120-124 via a direct link. For example, the direct link logic 111 may establish the direct link between the first STA 110 and each of the other STA 120-124 in accordance with one or more wireless protocols (e.g., an IEEE 802.11e/z standard protocol), such as a tunneled direct link setup (TDLS). In a particular embodiment, the direct link may be established in compliance with an IEEE 802.11z standard. Once the direct link is established between the first STA 110 and the other STA 120-124, data (e.g., data frames) may be communicated directly between STAs (e.g., not via the first AP 130).

The direct link logic 111 may also enable the first STA 110 to determine a capability of other STA 120-124. For example, the first STA 110 may determine a capability of the second STA 120, such as whether the second STA 120 is mobile or stationary, whether the second STA 120 is using a battery power supply, or a combination thereof. The first STA 110 may determine the capability of another STA 120-124 prior to, during, or after establishing a direct link with the other STA 120-124. In a particular embodiment, the direct link logic 111 may enable the first STA 110 to determine a capability of another STA 120-122 in a same $BSS_{11}$ as the first STA 110.

The direct link quality factor determination logic 112 may enable the first STA 110 to determine a direct link quality factor ($\alpha$) for each STA with which the first STA 110 establishes a direct link. The direct link quality factor ($\alpha$) may be determined based on a ratio of a measured link quality ($R_{direct}$) (e.g., a measured signal value associated with the direct link setup) and an expected link quality ($R_{ideal}$) (e.g., a theoretical signal value associated with the direct link setup). The direct link quality factor ($\alpha$) may be determined by:

$$\alpha = \frac{R_{direct}}{R_{ideal}}$$

Accordingly, a value of the direct link quality factor ($\alpha$) may range from zero (0) to one (1). A direct link quality factor ($\alpha$) value of one (1) for a particular STA may indicate that the first STA 110 and the particular STA are co-located. A direct link quality factor ($\alpha$) value of zero (0) for the particular STA may indicate that the first STA 110 and the particular STA are out of communication range (e.g., separated by a great distance). The first STA 110 may determine the direct link quality factor ($\alpha$) associated with the particular STA during a direct link discovery procedure with the particular STA (e.g., in accordance with IEEE 802.11e/z standard) or once the direct link is established with the particular STA.

For example, the direct link quality factor determination logic 112 of the first STA 110 may determine a first direct link quality factor ($\alpha_{11}$) associated with the second STA 120, a second direct link quality factor ($\alpha_{12}$) associated with the third STA 122, a third direct link quality factor ($\alpha_{13}$) associated with the fourth STA 124, or a combination thereof. Direct link quality factors ($\alpha$) may be determined on a periodic basis or on an as needed basis, such as when the first STA 110 is making a handoff decision (e.g., a handoff selection).

The direct link quality factor comparison logic 114 may enable the first STA 110 to request one or more other STAs 120-124 to scan for neighboring APs based on one or more determined direct link quality factors (α). For example, the direct link quality factor comparison logic 114 may compare direct link quality factors (α) of two or more different STAs. In a particular embodiment, the first STA 110 may request the STA having a highest direct link quality factor (α) value to perform the scan of the neighboring APs. In another example, the direct link quality factor comparison logic 114 may compare each direct link quality factor (α) value to a threshold. The first STA 110 may request each STA having a direct link quality factor (α) value that satisfies the threshold to perform a scan of the neighboring APs. For example, the first STA 110 may request each STA having a direct link quality factor (α) value greater than or equal to the threshold to perform a scan.

Communication logic 115 may enable the first STA 110 to engage in a wireless communication 150 with at least one other device via an AP that the first STA 110 is associated with (e.g., the first AP 130). For example, the wireless communication 150 may include a voice over Wi-Fi (VOWiFi) communication (e.g., a VOWiFi call)) between the first STA 110 and the at least one other device. The wireless communication 150 may comply with one or more IEEE 802.11 standards, such as IEEE 802.11a/b/g/e/n/z/ac. The at least one other device may include one of the STAs 120-124 or another device.

While the first STA 110 is engaged in the wireless communication 150, the first STA 110 may need to handoff (e.g., roam) from the first AP 130 to another AP 132-136. For example, the first STA 110 may need to handoff when the first STA 110 moves out of range of the first AP 130, or when an operating condition of a current operating channel associated with the wireless communication 150 deteriorates below a threshold. The first STA 110 may make a determination to handoff based on one or more factors, such as a received signal strength indicator (RSSI), a signal-to-noise ratio, a frequency of packet re-tries, etc.

When the first STA 110 determines to handoff, the first STA 110 may discover available APs 132-136 in a vicinity surrounding the first STA 110. As previously explained, the first STA 110 may discover one or more neighboring APs 132-136 via a scan performed by the first STA 110. However, when the first STA 110 is engaged in the wireless communication 150, measurements obtained by the first STA 110 during a scan may not be accurate enough for the first STA 110 to discover the one or more neighboring APs 132-136 and determine accurate measurements corresponding to each of the one or more neighboring APs 132-136.

Alternatively, the first STA 110 may discover the one or more neighboring APs 132-136 by requesting the first AP 130 to provide a report (e.g., via one or more probe responses or beacons) to the first STA 110, and/or by requesting another STA 120-124 to perform a scan on behalf of the first AP 110.

The memory 116 may include (store) one or more scan reports 118. For example, the one or more scan reports 118 may include a list of neighboring stations (e.g., APs) and one or more measurements associated with each of the stations (e.g., APs) included in the list of neighboring stations 118. The first STA 110 may receive the one or more scan reports 118 via the first AP 130 or directly from one of the STAs 120-124. One or more of the scan reports 118 may indicate one or more measurements (e.g., RCPI values) associated with the neighboring APs. Additionally, one or more of the scan reports 118 received by the first STA 110 may be based on a previous request to search for neighboring APs that was issued by the first STA 110. The first STA 110 may use the one or more scan reports 118 when making handoff determinations.

To make a handoff determination, the first STA 110 may rely on the stored scan reports 118 or may request another STA 120-124 to perform a scan of neighboring APs. The first STA 110 may rely on the stored scan reports 118 when the stored scan reports 118 were last updated within a particular time period. If the stored scan reports 118 have not been updated (or stored) within the particular time period, the first STA 110 may request one or more STAs 120-124 to scan for neighboring APs. In a particular embodiment, the first STA 110 may determine which STAs 120-124 to request to perform the scan by utilizing the direct link quality factor comparison logic 114. For example, the first STA 110 may identify a single STA of the STAs 120-124 having a highest direct link quality factor value. The first STA 110 may then request the single STA to perform a scan for one or more neighboring APs. When the first STA 110 receives one or more measurements from the single STA, the first STA 110 may automatically use the one or more measurements received from the single STA when making a handoff selection. The first STA 110 may automatically use the one or more measurements from the single STA because, by identifying the single STA having the highest direct link quality factor value of the plurality of STAs 120-124, the first STA has already determined that the one or more measurements provided by the single STA are relevant to the first STA 110. Based on the measurement information, the first STA 110 selects a particular AP, and the first STA 110 may disconnect from the first AP 130 with which the first STA 110 is currently associated and associate with the particular AP, thereby completing the handoff.

During operation of the first STA 110 associated with the first AP 130, the first STA 110 may be included in the $BSS_{11}$ with the second STA 120 and the third STA 122. The first STA 110 may establish a direct link with the second STA 120. For example, the first STA 110 may establish the direct link by utilizing the direct link logic 111. Additionally, the first STA 110 may determinate a capability of the second STA 120. For example, the capability may include an indication of mobility of the second STA 120, an indication of a power supply of the second STA 120, or a combination thereof.

The first STA 110 may be configured to operate using a battery power source or a constant power source. When the first STA 110 is operating using the battery power source, the first STA may request another STA 120-124 to scan for neighboring APs 130-136 so as not to expend power (e.g., use or deplete the battery source power) during a scanning operation. Additionally, scanning at the first STA 110 may require the first STA 110 to allocate a channel (in addition to a channel the first STA 110 is currently using), which may add latency to data traffic and consume further battery power. The first STA 110 may request another STA 120-124 to scan for the neighboring APs 130-136 based on a power supply source of the other STA 120-124. For example, the first STA 110 may request another STA 120-124 operating under a constant power source to perform a scan prior to requesting a different STA 120-124 operating under a battery power source. In a particular embodiment, the first STA 110 is a mobile station (operating using a battery power source) and the second STA is a fixed station (operating using a constant power source). The first STA 100 may also request other STAs 120-124 that are stationary to perform the scan prior to requesting other STAs 120-124 that are mobile. Thus, the method described enables the first STA 110 to delegate scanning to another STA 120-124 to avoid using an additional channel, to reduce latency of data traffic, to decrease battery power consumption, or a combination thereof.

The first STA 110 may determine a direct link quality factor ($\alpha$) value associated with the direct link between the first STA 110 and the second STA 120. The first STA 110 may also determine whether to request the second STA 120 to perform a scan for one or more APs (e.g., one or more neighboring APs 132-136). The first STA 110 may request the second STA 120 to perform the scan based on a comparison of the direct link quality factor ($\alpha$) value associated with the second STA 120 to a threshold value. In addition, or alternatively, the first STA 110 may request the second STA 120 to perform the scan based on a comparison of the direct link quality factor ($\alpha$) value associated with the second STA 120 to a direct link quality factor ($\alpha$) value associated with another STA (e.g., the third STA 122 or the fourth STA 124).

The first STA 110 may receive one or more measurements from the second STA 120. The one or more measurements may correspond to one or more APs (e.g., the APs 132-136) that are wirelessly detectable by the second STA 120. In a particular embodiment, the first STA 110 may receive a report from the second STA 120 that includes the one or more measurements. The report may be included in a beacon message received at the first STA 110.

Based on the direct link quality factor ($\alpha$) value, the first STA 110 may be able to determine a relative location of one or more STAs 120-124 with respect to the first STA 110. Based on the relative location with respect to the first STA 110, the first STA 110 may be enabled to request one or more measurements from another STA 120-124 or to determine whether received values (e.g., signal strength measurements) associated with neighboring APs are relevant to the first STA 110 or accurate enough for use by the first STA 110 when making a handoff decision. Thus, the first STA 110 may select a particular AP with which to perform a handoff operation based the one or more measurements from another STA 120-124 that is determined to be in a vicinity near the first STA 110.

Upon determining to use the one or more measurements received from a particular STA, the first STA 110 may determine a particular AP of the one or more APs as a handoff target. For example, the first STA 110 may select the particular AP with the strongest signal (based on the one or more RCPI values). As another example, the first STA 110 may have prioritized the one or more APs as candidates for a handoff target based on RCPI values. For example, the one or more APs may have been prioritized in hierarchical order (e.g., from a most preferred to a least preferred) based on the one or more RCPI values. Accordingly, the first STA 110 may select the particular AP as the handoff target based on the prioritized candidate APs. The first STA 110 may then initiate a handoff that includes the first STA 110 disassociating from the first AP 130 and associating with the particular AP (e.g., one of the APs 132-136).

Figure 2:
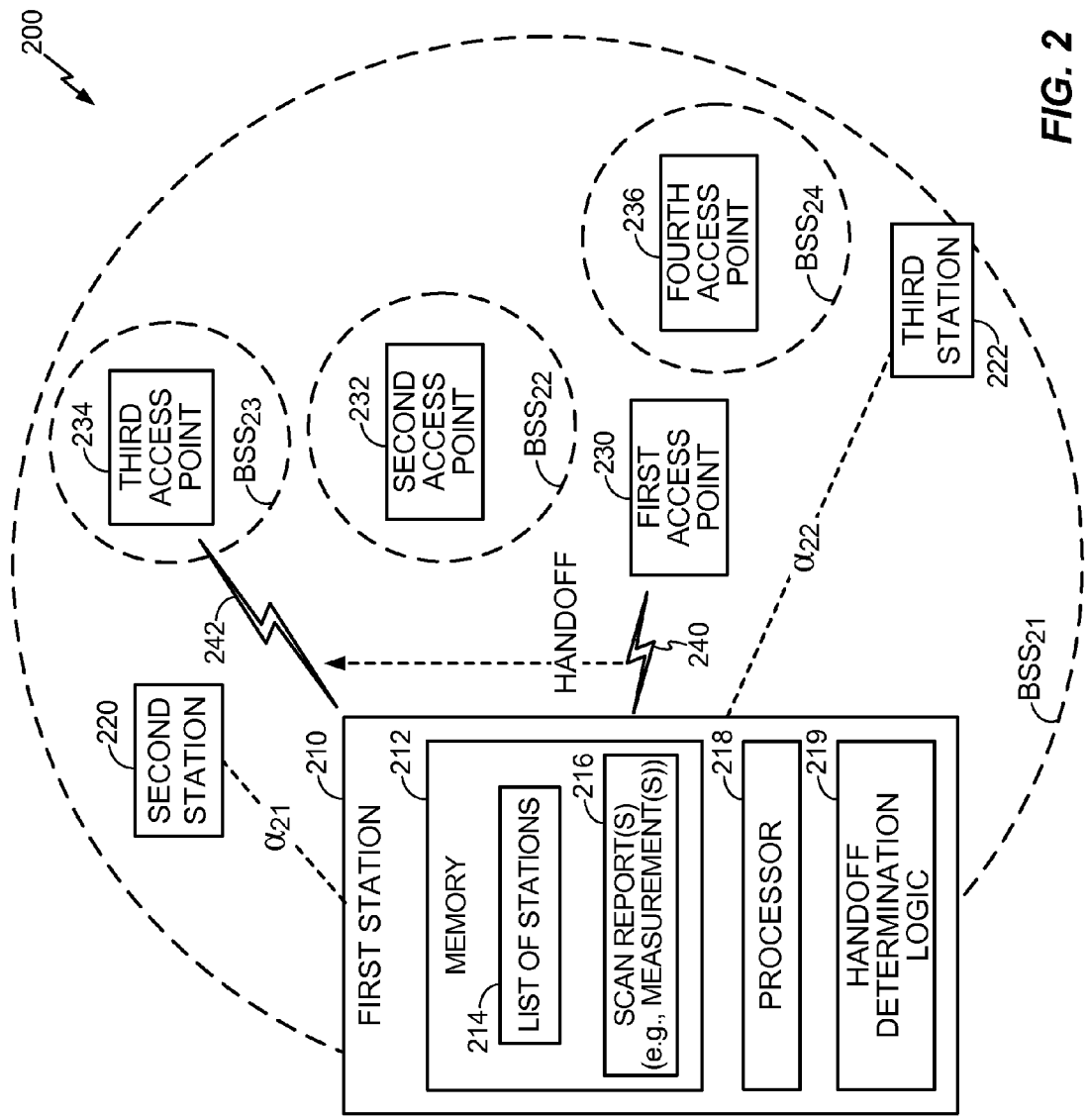
FIG. 2 is a block diagram of a second particular illustrative embodiment of a system to perform handoff selection based in part on at least one direct link quality factor ($\alpha$)

Referring to FIG. 2, a system 200 to perform handoff selection based in part on at least one direct link quality factor ($\alpha$) is shown. The system 200 may include one or more APs 230-236 and one or more STAs 210, 220-222. The one or more APs may include a first AP 230 corresponding to $BSS_{21}$, a second AP 232 corresponding to $BSS_{22}$, a third AP 234 corresponding to $BSS_{23}$, and a fourth AP 236 corresponding to $BSS_{24}$. The $BSS_{21}$ may include one or more STAs, such as a first STA 210, a second STA 220, and a third STA 222. Within the $BSS_{21}$, the first STA 210 may be located remotely from the second STA 220 and the third STA 222.

In an exemplary embodiment, the first STA 210 may include a memory 212, a processor 218, and handoff determination logic 219. The memory 212 may be configured to store a list of neighboring STAs 214 and one or more scan reports 216. For example, the memory 212 may include the memory 116 of FIG. 1. The one or more scan reports 216 may be received from one or more other STAs (e.g. one or more of the STAs 220-222) and include one or more measurements associated with one or more neighboring APs identified by the list of neighboring STAs 214. Additionally, the memory 212 may be configured to store one or more direct link quality factor ($\alpha$) values. Each direct link quality factor ($\alpha$) value may correspond to a STA 220-222 from which at least one of the one or more scan reports 216 was received. For example, the memory 212 may store a direct link quality factor ($\alpha_{21}$) value corresponding to the second STA 220 and a direct link quality factor ($\alpha_{22}$) value corresponding to the third STA 222.

The processor 218 may be coupled to the memory 216 and configured to control one or more operations of the first STA 210. For example, the processor 216 may include the direct link logic 111, the direct link quality factor determination logic 112, the direct link quality factor comparison logic 114, and the communication logic 115 of FIG. 1.

In a particular embodiment, the processor 218 may determine, based on the direct link quality factor ($\alpha_{21}$) value, whether to request the second STA 220 to perform a scan for APs within a wireless transmission range of the second STA 220. The first STA 210 may receive from the second STA 220 and store one or more measurements determined by the STA 220 for use by the processor 218. The one or more measurements may correspond to one or more APs, such as the APs 230-236, that are wirelessly detectable by the second STA 220. The processor 218 may determine whether to use the one or more measurements based on the direct link quality factor ($\alpha_{21}$) value. For example, the processor 218 may determine whether to use the one or more measurements based on a comparison between the direct link quality factor ($\alpha_{21}$) value and a threshold. Upon determining to use the one or more measurements, the processor 218 may determine a particular AP of the one or more APs (e.g., the APs 230-236) as a handoff target based on the one or more measurements. In another particular embodiment, the processor 218 may include multiple processors that are each configured to perform one or more of the processor functions described herein.

The handoff determination logic 219 may be coupled to the processor 218. In an alternative embodiment, the handoff determination logic 219 may be included in the processor 218. The handoff determination logic 219 may be configured to determine when the first STA 210 should initiate a handoff operation (e.g., a handoff procedure). For example, the handoff determination logic 219 may determine to handoff (e.g., roam) from the first AP 230 to another AP (e.g., one of the APs 232-236). In a particular embodiment, the handoff determination logic 219 may determine when the handoff operation should be initiated while the first STA 210 is engaged in a first wireless communication 240, such as a VOWiFi communication (e.g., a VOWiFi call), via the first AP 230. The handoff determination logic 219 may make a determination to handoff based on one or more factors, such as a received signal strength indicator (RSSI), a signal-to-noise ratio, or a frequency of packet re-tries.

The handoff determination logic 219 may also be configured to execute the handoff operation. The handoff determination logic 219 may access the memory 212 and identify the one or more neighboring APs 232-236 and select a particular AP with which to perform the handoff operation. For example, the handoff determination logic 219 may select the particular AP based on the scan reports 216. After selecting the particular AP, the handoff determination logic 219 may disconnect from the first AP 230 and associate the first STA 210 with the particular AP. Accordingly, the first STA 210 may maintain the wireless communication before, during, and after the handoff without interruption of the wireless communication. For example, when the particular AP includes the third AP 234, the continued wireless communication after the handoff may include a second wireless communication 242.

During operation of the system 200, the first STA 210 may be engaged in the first wireless communication 240, such a VOWiFi call, via the first AP 230 with which the first STA 210 is associated. The first STA 210 may determine the direct link quality factor ($\alpha_{21}$) value associated with the second STA 220 and the direct link quality factor ($\alpha_{22}$) value associated with the third STA 222. For example, the first STA 210 may have a direct link established with the second STA 220 having the direct link quality factor ($\alpha_{21}$) value of $\alpha_{21}=0.9$. The first STA 210 may also have a direct link established with the third STA 222 having the direct link quality factor ($\alpha_{22}$) value of $\alpha_{22}=0.5$.

The first AP 230 may provide a neighboring AP report to the first STA 210 as follows:
 {Second AP, RCPI=-85 decibels (db)},
 {Third AP, RCPI=-70 db}, and
 {Fourth AP, RCPI=-68 db}.

The first STA 210 may receive the neighboring AP report from the first AP 230 and store the neighboring AP report in the memory 212.

The first STA 210 may determine whether to request the second STA 220 to perform a scan for one or more APs 230-236 within a wireless transmission range of the second STA 220 based on the direct link quality factor ($\alpha_{21}$) value. Determining whether to request the second STA 210 to perform the scan may include comparing the direct link quality factor ($\alpha_{21}$) value of associated with the second STA 220 to the direct link quality factor ($\alpha_{22}$) value associated with the third STA 222. The first STA 210 may also determine whether to request the second STA 220 to perform the scan by comparing the direct link quality factor ($\alpha_{21}$) value to a threshold value.

Upon a determination to request the second STA 220 to perform the scan, the first STA 210 may request the second STA 220 to perform the scan and receive one or more measurements associated with the scan of the one or more neighboring APs that are detectable by the second STA 220. The first STA 210 may receive and store the one or more measurements from the second STA 220 as a beacon report (e.g., a neighboring AP report) as follows:
 {Second AP, RCPI=-75 db},
 {Third AP, RCPI=-70 db}, and
 {Fourth AP, RCPI=-80 db}.

The first STA 210 may further determine whether to request the third STA 222 to perform a scan for one or more neighboring APs detectable by the third STA 222. The first STA 210 may determine whether to request the third STA 222 to perform the scan based on the direct link quality factor ($\alpha_{22}$) value associated with the third STA 222. Upon a determination to request the third STA 222 to perform the scan, the first STA 210 may request the third STA 222 to perform the scan and receive one or more measurements associated with the scan of the one or more neighboring APs detectable by the third STA 222. The first STA 210 may receive and store the one or more measurements from the third STA 222 as a beacon report (e.g., an AP list) as follows:
 {Second AP, RCPI=-90 db},
 {Third AP, RCPI=-85 db}, and
 {Fourth AP, RCPI=-60 db}.

Upon determining to perform a handoff procedure, the handoff determination logic 219 may decide whether the second STA 220 or the third STA 222 provided more relevant measurements to the first STA 210 (e.g., based on $\alpha_{21}=0.9$ associated with the second STA 220 and $\alpha_{22}=0.5$ associated with the third STA 222). Because the direct link quality factor value ($\alpha_{22}=0.5$) of the third STA 222 is lower than the direct link quality factor value (e.g., $\alpha_{21}=0.9$) of the second STA 220, the first STA 210 may determine that the third STA 222 is farther away from the first STA 210 than the second STA 220. Accordingly, the one or more measurements from the second STA 220 may be more relevant to the first STA 210 than the one or more measurements from the third STA 222.

Thus, the first STA 210 may select a handoff target from the beacon report (e.g., scan report) received from the second STA 220. Accordingly, the first STA 210 may select the third AP 234 as a handoff target because the third AP 234 has the best corresponding RCPI value of all the APs in the scan report provided by the second STA 220. In a particular embodiment, the first STA 210 may select the AP having the highest RCPI value.

The first STA 210 may perform the handoff using the third AP 234 as the handoff target. During the handoff, the first STA 210 may disassociate with the first AP 230 and associate with the third AP 234. Accordingly, before the handoff, the first STA 210 may be engaged in the first wireless communication 240 via the first AP 230 and, after the handoff, the first STA 210 may be engaged in the second wireless communication 242 via the third AP 234. The second wireless communication 242 may be a continuation of the first wireless communication 240.

Based on a relative location with respect to the first STA 210, the first STA 210 may determine which other STA 220-222 provided measurements (e.g., a scan report) associated with neighboring APs that is relevant to the first STA 210. Thus, the first STA engaged in the wireless communication 240 may select a particular AP as the handoff target based on the one or more measurements provided by a STA that is determined to be in a vicinity near the first STA 210.

Figure 3:
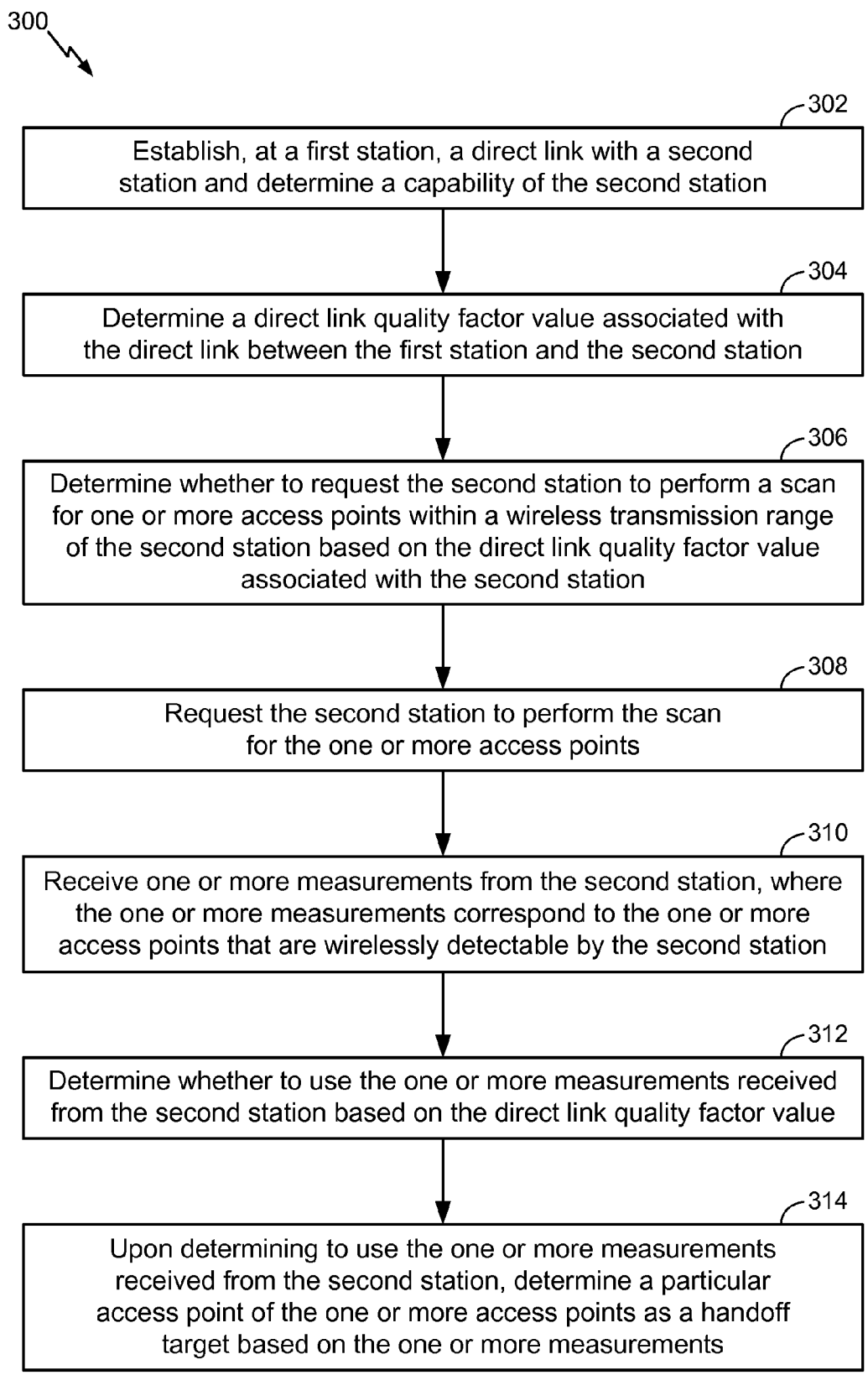
FIG. 3 is a flow diagram of an illustrative embodiment of a method to perform handoff selection based in part on at least one direct link quality factor ($\alpha$)

Referring to FIG. 3, a flow diagram of an illustrative embodiment of a method 300 to perform handoff selection based in part on at least one direct link quality factor ($\alpha$) is depicted. At a first station, a direct link with a second station may be established and a capability of the second station may be determined, at 302. The capability of the second station may indicate a mobility of the second station, a power supply of the second station, or a combination thereof. For example, the first station may establish a direct link and determine the capability of the second station using the direct link logic 111 of FIG. 1, the processor 218 of FIG. 2, or any combination thereof.

A direct link quality factor value associated with the direct link between the first station and the second may be determined, at 304. The first station may determine the direct link quality factor ($\alpha$) value during a direct link discovery procedure with the second station or once a direct link is established with the second station. The direct link quality factor ($\alpha$) value may be determined based on a ratio of a measured link quality ($R_{direct}$) (e.g., a measured signal value associated with the direct link setup) and an expected link quality ($R_{ideal}$) (e.g., a theoretical signal value associated with the direct link setup). For example, the direct link quality factor ($\alpha$) value may be determined at the first station by the direct link quality factor determination logic 112 of FIG. 1, the processor 218 of FIG. 2, or a combination thereof.

A determination may be made whether to request the second station to perform a scan for one or more access points within a wireless transmission range of the second station based on the direct link quality factor value associated with the second station, at 306. The determination to request the second station to perform the scan may be based on a comparison of the direct link quality factor value associated with the second station to a threshold value or to a direct link quality factor value associated with another station. For example, the determination to request the second station to perform the scan may be made at the first station by the direct link quality factor comparison logic 114 of FIG. 1, the processor 218 of FIG. 2, or a combination thereof. In a particular embodiment, the determination of whether to request the second station to perform the scan is initiated in response to a decision by the first station to perform a handoff.

A request for the second station to perform the scan for the one or more access points may be initiated, at 308. The first station may request the second station to perform the scan periodically or based on the direct link quality factor value associated with the second station. For example, the first station may request the second station to perform a scan based on a determination that the direct link quality factor value associated with the second station satisfies a threshold value or is greater than a direct link quality factor value associated with another station. For example, the first STA 110 may send a request to one or more of the STAs 120-124 of FIG. 1. As another example, the first STA 210 may send a request to one or more of the STAs 220-222 of FIG. 2.

One or more measurements from the second station may be received, at 310. The one or more measurements may correspond to the one or more access points that are wirelessly detectable by the second station. The first station may receive the one or more measurements from the second station as a scan report and store the scan report in a memory of the first station. For example, the first STA 110 may store the one or more measurements in the memory 116 of FIG. 1, or the first STA 210 may store the one or more measurements in the memory 212 of FIG. 2, or a combination thereof.

A determination may be made whether to use the one or more measurements received from the second station based on the direct link quality factor value, at 312. The first station may make the determination of whether to use the one or more measurements while the first station is engaged in a VOWiFi communication (e.g., a VOWiFi call). The first station may determine whether to use the one or more measurements based on a comparison of the direct link quality factor value (e.g., an α value) associated with the second station to a threshold value or to a direct link quality factor value associated with another station. A determination to use the one or more measurements from the second station indicates that the second station is in a vicinity near the first station and that the one or more measurements provided by the second station are relevant to the first station. For example, the determination to use the one or more measurements from the second station may be made at the first station using the direct link quality factor comparison logic 114 and the communication logic 115 of FIG. 1, the processor 218 and the handoff determination logic 219 of FIG. 2, or a combination thereof. In a particular embodiment, when the determination is based on a comparison to a threshold value, the first station may use a scan report received from an access point with which the first station is associated with or a scan report from a different station when the direct link quality factor value (of the second station) does not satisfy the threshold value.

Upon determining to use the one or more measurements received from the second station, a particular access point of the one or more access points may be determined as a handoff target based on the one or more measurements, at 314. The one or more measurements may be associated with a signal strength of one or more neighboring APs detectable by the second station. In a particular embodiment, the one or more measurements include received channel power indicator (RCPI) values of neighboring APs detectable by the second station. The first station may select the particular AP with which to perform a handoff operation based the one or more measurements (e.g., the RCPI values). For example, the determination (e.g., selection) of the particular AP may be made at the first station using the direct link quality factor comparison logic 114 and the communication logic 115 of FIG. 1, the processor 218 and the handoff determination logic 219 of FIG. 2, or a combination thereof. In a particular embodiment, the first station may make select the particular AP while the first station is engaged in the VOWiFi communication. After selecting the particular AP, the first station may perform a handoff operation while engaged in the VOWiFi communication by disconnecting with the AP that the first station is currently associated with and associating with the particular AP.

In accordance with the method 300, the first station may be enabled to request one or more measurements from the second station. The first station may determine whether the one or more measurements (e.g., signal strength measurements) associated with neighboring APs are relevant to the first station for use when making a handoff decision. Thus, when the first station is engaged in the VOWiFi communication, the first station may use the one or more measurements provided by the second station to select the particular AP with which to perform a handoff operation. Accordingly, the first station may delegate scanning for neighboring APs to another station (e.g., the second station) and conserver power that would otherwise be expending by the first station having to perform a scan for neighboring APs that are detectable (e.g., wirelessly detectable) by the first station.

The method 300 may be performed in an order other than that shown in FIG. 3 and not all the steps of the method 300 may be performed. In a particular embodiment, the method 300 may not determine whether to request the second STA to perform a scan, at 304, but rather, the method may automatically request the second STA to perform the scan, at 308. For example, the method may periodically request the second STA to perform the scan.

In another particular embodiment, when the method 300 determines whether to request the second STA to perform a scan for one or more APs, at 306, the method may not determine whether to use one or more measurements received from the second STA, at 312. For example, the method 300 may automatically use the one or more measurements received from the second STA when making a handoff decision. The one more measurements of the second STA may automatically be used because, by requesting the second STA to perform the scan based on the direct link quality factor value associated with the second STA, a determination has already been made that the one or more measurements provided by the second STA are relevant to the first STA.

The method 300 of FIG. 3 may be implemented or otherwise performed by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 300 of FIG. 3 can be initiated by a processor that executes instructions stored in the memory 432, as described with respect to FIG. 4.

Figure 4:
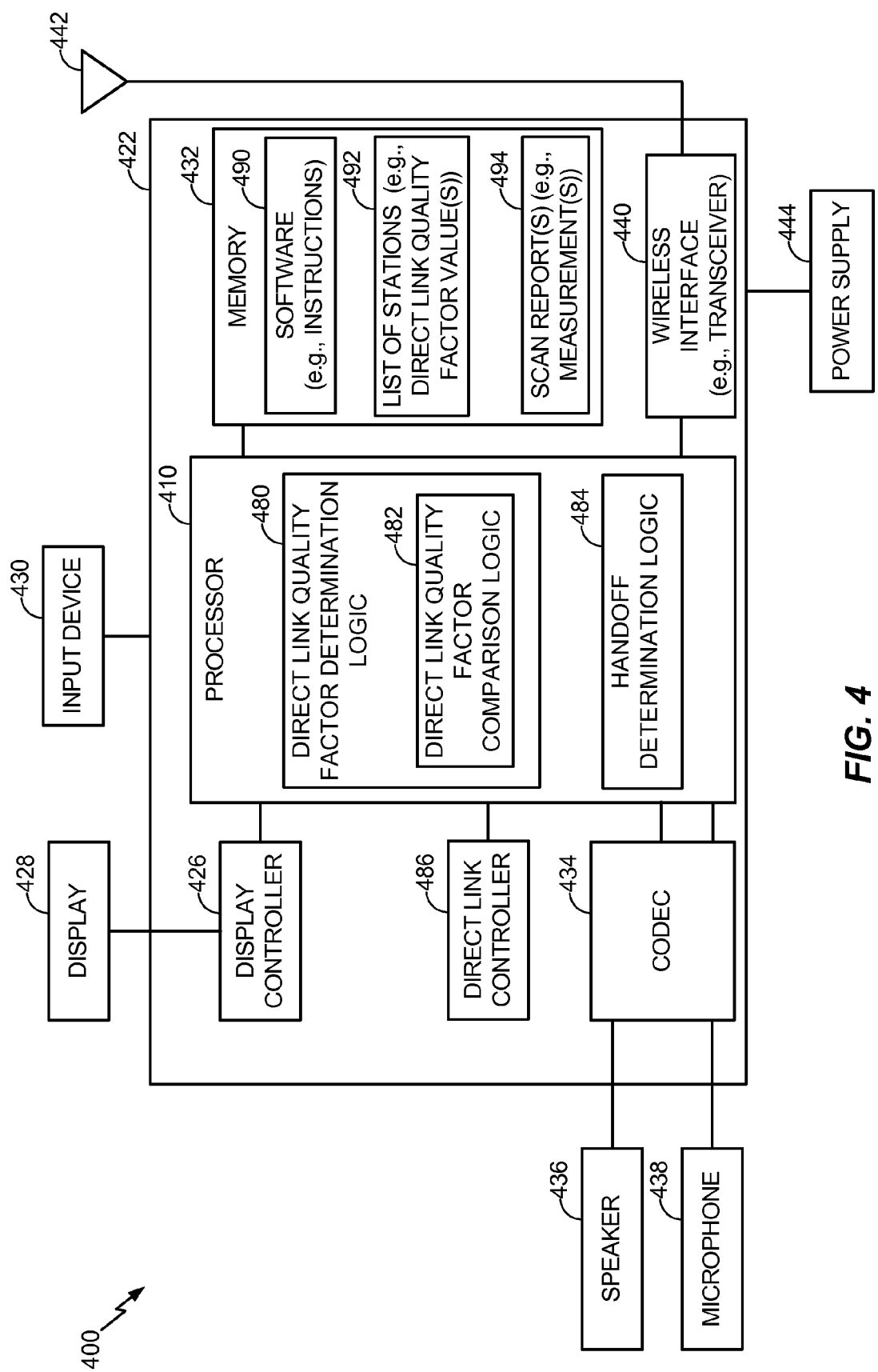
FIG. 4 is a block diagram of a particular embodiment of a device configured to perform handoff selection based in part on at least one direct link quality factor ($\alpha$).

FIG. 4 is a block diagram of particular embodiment of a device 400 (e.g., a communication device) configured to perform handoff selection based in part on a direct link quality factor (α) value. For example, the device 400 may include one or more of the STAs 110, 120-124 and the APs 130-136 of FIG. 1 and the STAs 210, 220-222 and the APs 230-236 of FIG. 2. The device 400 may be a wireless electronic device and include a processor 410, such as a digital signal processor (DSP), coupled to a memory 432.

The memory 432 may include (e.g., store) software 490, a list of stations 492, and a list of scan report(s) 494. For example, the memory 432 may include the memory 116 of FIG. 1 or the memory 212 of FIG. 2. The software (e.g., instruction(s)) may be accessible and executable by the processor 410. The list of stations 492 may include a list of one or more neighboring devices (e.g., stations or access points) that the device 400 may be able to communicate with. The list of stations 492 may include a direct link quality factor value for each entry in the list of stations 492. The scan reports 494 may include measurements received from one or more devices, such as the one or more neighboring stations identified in the list of stations 492.

The processor 410 may be configured to access data (e.g., the list of stations 492, and the scan reports 494) or program instructions (e.g., the software 490) stored at the memory 432. The processor 410 may include direct link quality factor determination logic 480 and handoff determination logic 484. The direct link quality factor determination logic 480 may include direct link quality factor comparison logic 482. The direct link quality factor determination logic 480 may determine a direct link quality factor ($\alpha$) value during a direct link discovery procedure between the device 400 and another device or once a direct link is established between the device 400 and the other device. The direct link quality factor ($\alpha$) value may be determined based on a ratio of a measured link quality ($R_{direct}$) and an expected link quality ($R_{ideal}$). The direct link quality factor comparison logic 482 may be used to compare a direct link quality factor ($\alpha$) value for a first other device to a threshold value or to a direct link quality factor ($\alpha$) value of a second other device. Based on a result of the comparison, the device 400 may determine to request the first other device to perform a scan for one or more neighboring access points or may determine to use a scan report (e.g., one of the scan reports 494) received from the first other device to select a particular access point as a handoff target. The handoff determination logic 484 may determine when the device 400 should initiate a handoff operation (e.g., a handoff procedure). When the handoff determination logic 484 makes a determination to handoff, the handoff determination logic 484 may execute the handoff operation using the selected handoff target.

In an illustrative example, the processor 410 includes any of the direct link logic 111, the direct link quality factor determination logic 112, the direct link quality factor comparison logic 114, and the communication logic 115 of FIG. 1 and the processor 218 and the handoff determination logic 219 of FIG. 2 and operates in accordance with the embodiment of FIG. 3, or any combination thereof.

The device 400 may also include a direct link controller 486. The direct link controller 486 may include the direct link logic 111 of FIG. 1 or the processor 218 of FIG. 2. The direct link controller 486 may be configured to perform a direct link discovery procedure to identify one or more other devices with which the device 400 may establish a direct link. The direct link controller 486 may also be configured to establish the direct link between the device 400 and one or more of the other identified devices. In a particular embodiment, the direct link controller may include the direct link logic 111, the direct link quality factor determination logic 112, and the direct link quality factor comparison logic 114 of FIG. 1. In an alternate embodiment, the direct link controller 486 may include the direct link quality factor determination logic 480 and the direct link quality factor comparison logic 482 of FIG. 4 (instead of such logic being in the processor 410).

A display controller 426 is coupled to the processor 410 and to a display device 428. A coder/decoder (CODEC) 434 can also be coupled to the processor 410. A speaker 436 and a microphone 438 can be coupled to the CODEC 434. A wireless interface 440 can be coupled to the processor 410 and to a wireless antenna 442 such that wireless data received via the antenna 442 and the wireless interface 440 can be provided to the processor 410. The wireless interface 440 may include a transceiver (e.g., a wireless transceiver). The transceiver may include a receiver, a transmitter, or a combination thereof. In a particular embodiment, the processor 410 may be configured to initiate establishment of a direct link between the device 400 and another device via the transceiver. Although a single antenna 442 and a single wireless interface 440 are shown in FIG. 4, multiple antennas 442 and multiple wireless interfaces 440 may be included in the device 400.

The processor 410 may be configured to execute software 490 (e.g., computer executable instructions) stored at a non-transitory computer-readable medium, such as the memory 432, that are executable to cause a computer, such as the processor 410, to determine, at a first station, a direct link quality factor value associated with a direct link between the first station and a second station. The computer executable instructions 490 are further executable to cause the processor 410 to process instructions that determine whether to use one or more measurements received from the second station based on the direct link quality factor value, where the one or more measurements correspond to one or more access points that are wirelessly detectable by the second station. The computer executable instructions are further executable to, upon determining to use the one or more measurements received from the second station, determine a particular access point of the one or more access points as a handoff target based on the one or more measurements.

The processor 410 may be configured to execute the computer executable instructions 490 to determine, at a first station, a direct link quality factor value associated with a second station. The computer executable instructions 490 may further be executable to determine whether to request the second station to perform a scan for one or more access points within a wireless transmission range of the second station based on the direct link quality factor value associated with the second station.

In a particular embodiment, the processor 410, the display controller 426, the memory 432, the CODEC 434, the wireless interface 440, and the controller 486 are included in a system-in-package or system-on-chip device 422. In a particular embodiment, an input device 430 and a power supply 444 are coupled to the system-on-chip device 422. Moreover, in a particular embodiment, as illustrated in FIG. 4, the display device 428, the input device 430, the speaker 436, the microphone 438, the wireless antenna 442, and the power supply 444 are external to the system-on-chip device 422. However, each of the display device 428, the input device 430, the speaker 436, the microphone 438, the wireless antenna 442, and the power supply 444 can be coupled to a component of the system-on-chip device 422, such as an interface or a controller.

In conjunction with one or more of the described embodiments, an apparatus is disclosed that may include means for determining, at a first station, a direct link quality factor value associated with a direct link between the first station and a second station. The means for determining a direct link quality factor value may include the direct link quality factor determination logic 112 of FIG. 1, the processor 218 of FIG. 2, the processor 410, the direct link quality factor determination logic 480, the direct link controller 486, the software 490 of FIG. 4, and one or more other devices or circuits configured to determine a direct link quality factor, or any combination thereof.

The apparatus may also include means for receiving one or more measurements from the second station, where the one or more measurements correspond to one or more access points that are wirelessly detectable by the second station. The means for receiving one or more measurements may include the processor 218 of FIG. 2, the processor 410, the antenna 442, the wireless interface 440, the software 490 of FIG. 4, one or more other devices or circuits configured receive one or more measurements, or any combination thereof.

The apparatus may also include means for determining whether to use the one or more measurements received from the second station based on the direct link quality factor value. The means for determining whether to use the one or more measurements may include the direct link logic 111, the direct link quality factor determination logic 112, the direct link quality factor comparison logic 114 of FIG. 1, the processor 218 of FIG. 2, the processor 410, the direct link quality factor determination logic 480, the direct link quality factor comparison logic 482, the direct link controller 486, the software 490 of FIG. 4, one or more other devices or circuits configured to determining whether to use the one or more measurements, or any combination thereof.

In conjunction with one or more of the described embodiments, an apparatus is disclosed that may include means for determining, at a first station, a direct link quality factor value associated with a second station. The means for determining the direct link quality factor value may include the direct link quality factor determination logic 112 of FIG. 1, the processor 218 of FIG. 2, the processor 410, the direct link quality factor determination logic 480, the direct link controller 486, the software 490 of FIG. 4, one or more other devices or circuits configured to determine the direct link quality factor value, or any combination thereof.

The apparatus may also include means for determining whether to request the second station to perform a scan for one or more access points within a wireless transmission range of the second station based on the direct link quality factor value associated with the second station. The means for determining whether to request the second station to perform a scan may include the direct link logic 111, the direct link quality factor determination logic 112, the direct link quality factor comparison logic 114, the communication logic 115 of FIG. 1, the processor 218 or the handoff determination logic 219 of FIG. 2, the processor 410, the direct link quality factor determination logic 480, the direct link quality factor comparison logic 482, the direct link controller 486, the handoff determination logic 484, the software 490 of FIG. 4, one or more other devices or circuits configured to determine whether to request the second station to perform a scan, or any combination thereof.

The apparatus may also include means for comparing the direct link quality factor value to a threshold. The means for comparing may include the direct link logic 111 or the direct link quality factor comparison logic 114 of FIG. 1, the processor 218 of FIG. 2, the processor 410, the direct link quality factor comparison logic 482, the direct link controller 486, the software 490 of FIG. 4, one or more other devices or circuits configured to compare a direct link quality factor to a threshold, or any combination thereof.

The apparatus may also include means for determining whether to request the second station to perform a scan for the one or more access points based on the direct link quality factor value associated with the second station. The means for determining whether to request the second station to perform the scan may include the direct link logic 111, the direct link quality factor determination logic 112, the direct link quality factor comparison logic 114, the communication logic 115 of FIG. 1, the processor 218 or the handoff determination logic 219 of FIG. 2, the processor 410, the direct link quality factor determination logic 480, the direct link quality factor comparison logic 482, the direct link controller 486, the handoff determination logic 484, the software 490 of FIG. 4, one or more other devices or circuits configured to determine whether to request the second station to perform the scan, or any combination thereof.

The apparatus may also include means for establishing a direct link between the first station and the second station. The means for establishing may include the direct link logic 111 of FIG. 1, the processor 218 of FIG. 2, the direct link controller 486, the processor 410, the antenna 442, the wireless interface 440, the software 490 of FIG. 4, one or more other devices or circuits configured to establish the direct link between the first station and the second station, or any combination thereof.

The apparatus may also include means for initiating a voice over Wi-Fi (VOWiFi) communication. The means for initiating may include the communication logic 115 of FIG. 1, processor 218 of FIG. 2, the processor 410, the antenna 442, the wireless interface 440, the software 490 of FIG. 4, one or more other devices or circuits configured to initiate the VOViFi communication, or any combination thereof.

One or more of the disclosed embodiments may be implemented in a system or an apparatus, such as the device 400, that may include a communications device, a fixed location data unit, a mobile location data unit, a mobile phone, a cellular phone, a computer, a tablet, a portable computer, or a desktop computer. Additionally, the device 400 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-4 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   determining, at a first station, a direct link quality factor value associated with a direct link between the first station and a second station;
   receiving one or more measurements from the second station, wherein the one or more measurements correspond to one or more access points that are wirelessly detectable by the second station;
   determining, based on the direct link quality factor value, whether to use the one or more measurements received from the second station to make an access point handoff decision; and
   upon determining to use the one or more measurements received from the second station, determining a particular access point of the one or more access points as a handoff target based on the one or more measurements.

2. The method of claim 1, further comprising establishing the direct link with the second station prior to determining the direct link quality factor value.

3. The method of claim 1, wherein the direct link quality factor value is determined based on a ratio of a measured link quality ($R_{direct}$) associated with the second station to an expected link quality ($R_{ideal}$) associated with the second station.

4. The method of claim 1, further comprising requesting the second station to perform a scan for the one or more access points based on a comparison of the direct link quality factor value associated with the second station to a threshold value.

5. The method of claim 1, further comprising requesting the second station to perform a scan for the one or more access points based on a comparison of the direct link quality factor value associated with the second station to a direct link quality factor value associated with a third station.

6. The method of claim 1, further comprising determining whether to request the second station to perform a scan for the one or more access points while the first station is engaged in a voice over Wi-Fi (VOWiFi) communication.

7. The method of claim 1, further comprising determining a capability of the second station.

8. The method of claim 7, wherein the capability includes an indication of mobility of the second station, an indication of a power supply of the second station, or a combination thereof.

9. The method of claim 1, further comprising receiving a report from the second station, wherein the report includes the one or more measurements.

10. The method of claim 9, wherein the report is included in a received beacon message.

11. The method of claim 1, further comprising prioritizing the one or more access points as candidates for the handoff target based on the one or more measurements.

12. The method of claim 1, further comprising periodically requesting the second station to perform a scan for the one or more access points, wherein the first station and the second station are included in a basic service set (BSS) of a first access point.

13. The method of claim 12, further comprising initiating a handoff, wherein the handoff includes the first station disassociating from the first access point and associating with the particular access point.

14. An apparatus comprising:
    a processor configured to:
      determine a direct link quality factor value associated with a direct link to a station;
      determine, based on the direct link quality factor value, whether to use one or more measurements received from the station to make an access point handoff decision, wherein the one or more measurements correspond to one or more access points that are wirelessly detectable by the station; and
      upon determining to use the one or more measurements received from the station, determine a particular access point of the one or more access points as a handoff target based on the one or more measurements; and
    a memory coupled to the processor, the memory configured to store the one or more measurements.

15. The apparatus of claim 14, further comprising:
    a transceiver coupled to the processor; and
    wherein the processor is further configured to initiate establishment of the direct link to the station via the transceiver.

16. The apparatus of claim 15, wherein the direct link is established in compliance with an Institute of Electrical and Electronics Engineers (IEEE) 802.11z standard.

17. The apparatus of claim 14, wherein the memory is further configured to store the direct link quality value.

18. The apparatus of claim 14, wherein the processor is further configured to determine whether to request the station to perform a scan for the one or more access points based on the direct link quality factor value associated with the station.

19. The apparatus of claim 14, wherein the processor is further configured to determine whether to use the one or more measurements based on a comparison between the direct link quality factor value and a threshold.

20. The apparatus of claim 14, wherein the processor is further configured to initiate a request for the station to determine the one or more measurements and wherein the one or more measurements include one or more received channel power indicator (RCPI) values.

21. The apparatus of claim 20, wherein the particular access point is selected from the one or more access points based on the particular access point having a strongest signal of the one or more access points as indicated based on the one or more RCPI values.

22. A non-transitory processor-readable medium comprising instructions that, when executed by a processor, cause the processor to:
    determine, at a first station, a direct link quality factor value associated with a direct link between the first station and a second station;
    determine, based on the direct link quality factor value, whether to use one or more measurements received from the second station to make an access point handoff decision, wherein the one or more measurements correspond to one or more access points that are wirelessly detectable by the second station; and
    upon determining to use the one or more measurements received from the second station, determine a particular access point of the one or more access points as a handoff target based on the one or more measurements.

23. The non-transitory processor-readable medium of claim 22, further comprising instructions that, when executed by the processor, cause the processor to initiate, based on the direct link quality factor value associated with the second station, a request for the second station to perform a scan for the one or more access points.

24. The non-transitory processor-readable medium of claim 22, further comprising instructions that, when executed by the processor, cause the processor to determine the direct link quality factor value based on a ratio of a measured link quality ($R_{direct}$) associated with the second station to an expected link quality ($R_{ideal}$) associated with the second station.

25. An apparatus comprising:
    means for determining, at a first station, a direct link quality factor value associated with a direct link between the first station and a second station;
    means for receiving one or more measurements from the second station, wherein the one or more measurements correspond to one or more access points that are wirelessly detectable by the second station;
    means for determining, based on the direct link quality factor value, whether to use the one or more measurements received from the second station to make an access point handoff decision; and
    means for determining a particular access point of the one or more access points as a handoff target upon a determination to use the one or more measurements received from the second station, wherein the particular access point is determined based on the one or more measurements.

26. The apparatus of claim 25, further comprising means for comparing the direct link quality factor value to a threshold.

27. The apparatus of claim 25, further comprising means for determining whether to request the second station to perform a scan for the one or more access points based on the direct link quality factor value associated with the second station.

28. The apparatus of claim 25, further comprising means for establishing the direct link between the first station and the second station.

29. The apparatus of claim 25, further comprising means for initiating, at the first station, a voice over Wi-Fi (VOWiFi) communication.

30. A method comprising:
    determining, at a first station, a direct link quality factor value associated with a second station;
    determining whether to request the second station to perform a scan for one or more access points within a wireless transmission range of the second station based on the direct link quality factor value associated with the second station; and
    determining, based on the direct link quality factor value, whether to use the one or more measurements received from the second station to make an access point handoff decision.

31. The method of claim 30, wherein determining whether to request the second station to perform the scan comprises comparing the direct link quality factor value of the second station to a threshold value.

32. The method of claim 30, further comprising:
    requesting the second station to perform the scan for the one or more access points; and
    receiving, from the second station, one or more measurements associated with the scan of the one or more access points.

33. The method of claim 30, wherein determining whether to request the second station to perform the scan for the one or more access points occurs while the first station is engaged in a voice over Wi-Fi (VOWiFi) communication.

34. The method of claim 33, further comprising performing a handoff, wherein, during the handoff, the first station disassociates with a first access point and associates with a second access point.

35. The method of claim 30, wherein the first station is located remotely from the second station.

36. The method of claim 30, further comprising:
    determining, at the first station, a direct link quality factor value associated with a third station; and
    determining whether to request the third station to perform a scan for one or more access points based on the direct link quality factor value associated with the third station.

37. The method of claim 30, wherein determining whether to request the second station to perform the scan for the one or more access points comprises comparing the direct link quality factor value associated with the second station to a direct link quality factor value associated with a third station.

* * * * *